United States Patent [19]

Jeter

[11] Patent Number: 4,781,393

[45] Date of Patent: Nov. 1, 1988

[54] TRAILER LIGHT CONVERTOR

[76] Inventor: C. Duane Jeter, Rte. 5, Box 866 G, Midland, Tex. 79707

[21] Appl. No.: 67,617

[22] Filed: Jun. 26, 1987

[51] Int. Cl.⁴ .............................................. B60D 7/04
[52] U.S. Cl. .............................. 280/422; 307/10 LS; 439/35; 439/49
[58] Field of Search ...................... 280/422, 420, 421; 307/9, 10 R, 10 LS; 340/67; 439/34, 35, 43, 49, 52, 54

[56] References Cited

U.S. PATENT DOCUMENTS

| | | | |
|---|---|---|---|
| 2,975,297 | 3/1961 | O'Neil | 307/10 R |
| 2,989,645 | 6/1961 | Frieden | 307/10 R |
| 2,994,001 | 7/1961 | Moorhead, Jr. | 307/10 R |
| 4,270,115 | 5/1981 | Bonnett | 307/10 R X |
| 4,325,052 | 4/1982 | Koerner | 307/10 LS X |
| 4,405,190 | 9/1983 | Schroeder | 307/10 LS X |

Primary Examiner—David M. Mitchell
Assistant Examiner—Charles R. Watts
Attorney, Agent, or Firm—Wendell Coffee

[57] ABSTRACT

To match the wires of a pickup to a trailer, a conversion box is provided. The jumper adapters are used to convert the plugs from the pickup to a six connection plug. Another adapter connects the wires from the trailer to a six wire connector. Therefore, a standard six wire box is used regardless of the fact that the pickup and the trailer may neither have six wires nor the same number of wires as the other.

The wires from the pickup are connected to switch wires which have banana plugs on the end. The wires from the trailer are connected to receptacles so that when each switch wire is plugged into a receptacle, a connection is made. Lights on the box are used to indicate which of the truck wires are activated.

5 Claims, 2 Drawing Sheets

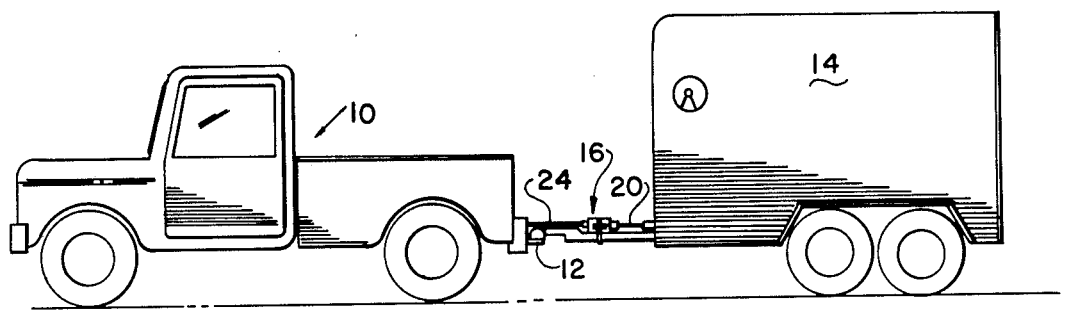
FIG-1
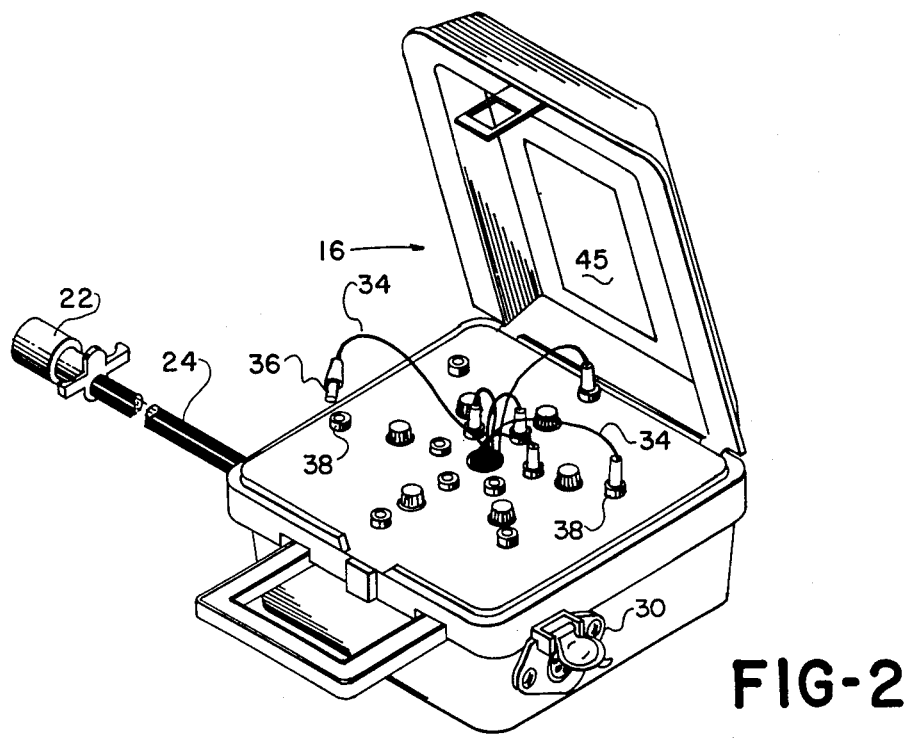
FIG-2
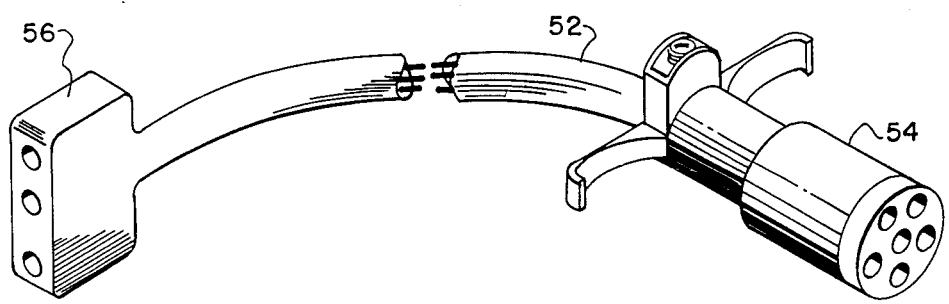
TO TRAILER     FIG-4     TO BOX 16

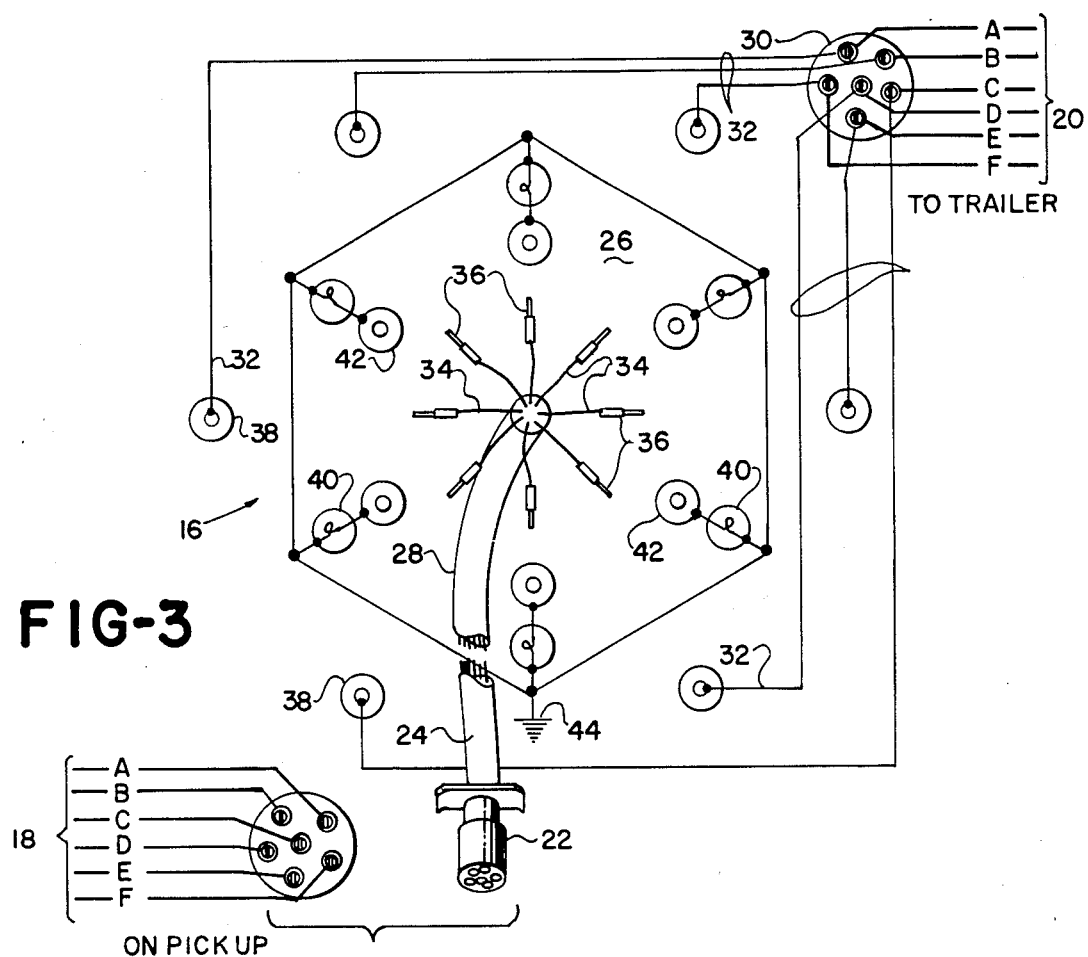
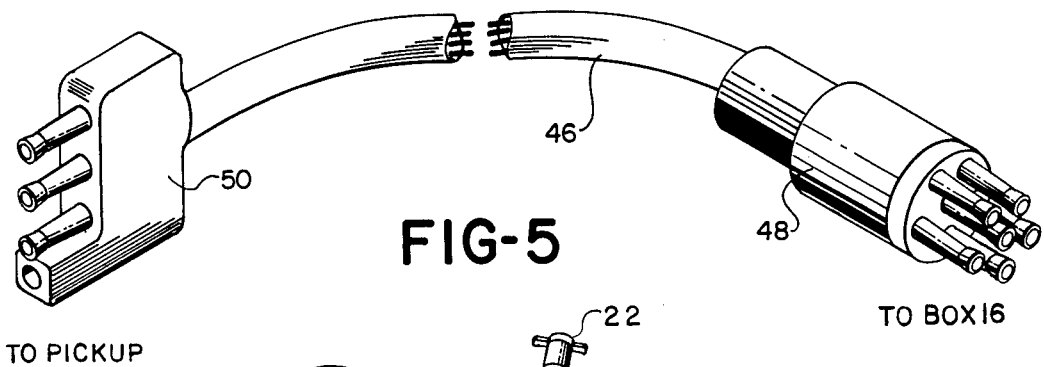
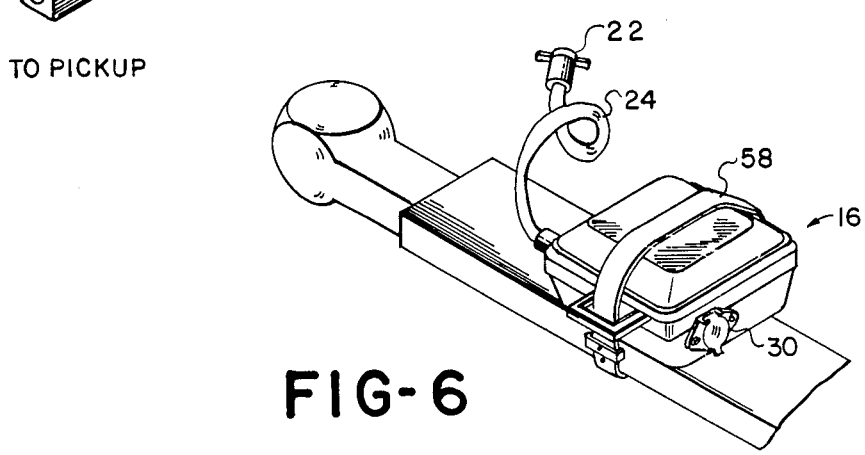

TRAILER LIGHT CONVERTOR

RIGHTS TO INVENTIONS UNDER FEDERAL RESEARCH

There was no federally sponsored research and development concerning this invention.

BACKGROUND OF THE INVENTION (1) Field of the Invention

This invention relates to lights upon a trailer towed behind a truck or other towing vehicle.

(2) Description of the Related Art

In many instances, and in particular, in agricultural, ranching, or recreational pursuits, a pickup truck is used to tow one of many different trailers. When towing the trailers, it is necessary to have an electrical connection between the pickup and the trailer for the operation of running lights, brake (or stop) lights, turn signals, and utility lights.

In commercial practice today there are many different systems of trailer lights basically ranging from a three wire system to a six wire system. For example, using extremely light trailers such as might be used to haul light boats or the like, a three wire system might be used. I.e., there would be one wire which would be connected to the running lights, often called tail lighs and another wire going to the left turn signal, and a third wire going to the right turn signal. Inasmuch as on automobiles, normally the same electrical connection or wire is used for the brakes as is used for activating the turn signals, this is satisfactory for many instances. In other instances, there would be four wires which would be the above identified three wires plus a ground wire. In the simple three wire system, the metal connection of the trailer hitch is used for the electrical ground or else a separate wire outside of the connections is used for the ground wire. In other systems a five wire system is used where there is a separate brake wire. In many cases where a heavier trailer is carried, such as a horse trailer, there will be an additional a utility wire. The utility would provide power for whatever utilization the owner desired that was provided on the trailer.

There are different connectors or plugs and sockets for each of the three, four, five, or six wire systems.

In some cases, the pickup will be "factory wired", and the wires from the pickup to the connector will be in standardized positions. Occasionally, the trailers will be wired to match the standard system on the pickup. However, other times, neither the pickup nor the trailer is wired according to any standard.

Furthermore, it is not unusual for the pickup to be wired for a four, five, or six wire system and the trailer to be wired and have a connector for a three wire system or some other number of wires other than that of the pickup. It will be understood that it can take considerable time for someone such as a rancher to reconnect the wires so that the left turn signal of the pickup matches the left turn signal of the trailer. If one operator having two trucks and five trailers desires, supposedly, he could have all of his trucks and all of his trailers wired according to the same pattern of connections and all using the same connectors. However, in many instances, the person with the pickup might wish to borrow a pickup or borrow a trailer which is not identically wired, taking considerable time to adapt.

Before this application was filed, the applicant was aware of the following U.S. Pat. Nos.:

| Inventor | U.S. Pat. No. | Issue Date |
|---|---|---|
| HUNT | 2,660,679 | 11/24/53 |
| HILS | 3,428,334 | 02/18/69 |
| STEWART | 3,497,707 | 02/24/70 |
| RIVERS | 3,628,811 | 12/21/71 |
| BURKLE | 3,915,476 | 10/28/75 |
| TIBBITS | 4,005,313 | 01/25/77 |
| YOUNG | 4,057,310 | 11/08/77 |

SUMMARY OF THE INVENTION (1) Progressive Contribution to the Art

This invention solves a problem by providing a convertor box by which a trailer may be connected to a pickup and the lights of the trailer properly connected quickly, regardless of the connections used on the pickup or the connections used upon the trailer.

Basically, the box has a six wire plug to be plugged into a socket on a pickup and a six wire socket into which the trailer plug may be attached. Assuming that both the pickup and the trailer have six wire connectors, the box can be quickly connected to the pickup and the trailer. Each of the hot wires connected from the pickup terminate in a switch wire with a pin upon the end. Each of the trailer or light wires terminate in a receptacle. Therefore, there will be six pickup hot pins and six trailer light receptacles. Then, one set of lights can be activated on the pickup, e.g., the running lights, and the operator can quickly connect the pins into the different sockets until the running lights of the trailer are illuminated and the pin firmly plugged into that receptacle. Then the operator turns on each of the other lights in their turn and plugs the proper pin into the receptacles until the proper receptacle is found until as many wires are connected as there are on the trailer and the pickup.

If, for example, the pickup truck has a four wire connection on it, then a jumper is used. The jumper has a six prong socket on one end to connect to the plug on the box, and a four connection plug on the other end to be connected to the pickup truck. There would be only four wires in the jumper, inasmuch as there were only four wires to the towing vehicle to be connected. It is immaterial as to how the wires were connected because the connections would be unscrambled at the time the box was used.

Likewise, if there were only three wires to the trailer, a trailer jumper would be used. The trailer jumper has a plug on one end to connect into the socket from the box and a socket on the other end to connect to the plug on the trailer. The trailer jumper has only three wires inasmuch as that was all the wires that the trailer has. How they were connected to the six wire plug would be immaterial inasmuch as the box would be used to make the connections in any event. Once having connected the box to the towing vehicle by its jumper and the box to the trailer by its jumper, then all that would be necessary is to make the correct connections. E.g., first the running lights would be tuned on the towing vehicle. Test lamps can be provided in the box so that each pin, is identified as energized.

(2) Objects of this Invention

An object of this invention is to connect energized or hot wires from a towing vehicle to the proper light wires of a trailer.

Further objects are to achieve the above with devices that are sturdy, compact, durable, lightweight, simple, safe, efficient, versatile, ecologically compatible, energy conserving, and reliable, yet inexpensive and easy to manufacture, connect, operate and maintain.

Other objects are to achieve the above with a method that is rapid, versatile, ecologically compatible, energy conserving, efficient, and inexpensive, and does not require highly skilled people to connect, adjust, operate, and maintain.

The specific nature of the invention, as well as other objects, uses, and advantages thereof, will clearly appear from the following description and from the accompanying drawing, the different views of which are not scale drawings.

BRIEF DESCRIPTION OF THE DRAWING

FIG. 1 is a side elevational view of a pickup truck with a trailer hitched thereto with the convertor box attached.

FIG. 2 is a perspective view of the convertor box with the cover open.

FIG. 3 is a schematic representation of the electrical circuits in the convertor box.

FIG. 4 is a perspective view of the light adapter jumper.

FIG. 5 is a perspective view of the hot adapter jumper.

FIG. 6 is an enlarged perspective view of the tongue of the trailer with the converter box clamped thereto.

As an aid to correlating the terms of the claims to the exemplary drawing, the following catalog of elements and steps is provided:

10 towing vehicle
12 trailer hitch
14 trailer
16 convertor box
18 hot wires
20 light wires
22 plug means
24 pig tail
26 electrical circuits
28 switch wires
30 socket means
32 receptacle wires
34 flexible switch wires
36 pin
38 receptacles
40 test lamp
42 test receptacle
44 ground
46 hot jumper
48 hot socket
50 tow plug
52 light jumper
54 light plug
56 trailer socket
58 clamp means
A running
B left turn
C right turn
D ground
E brake
F utility

DESCRIPTION OF THE PREFERRED EMBODIMENT

Referring to the drawing there may be seen a towing vehicle 10 having trailer hitch 12 by which trailer 14 is attached to the towing vehicle. Converter box 16 is attached to the trailer near the trailer hitch.

The towing vehicle will have a plurality of energized or hot wires 18. These hot wires will individually be identified as:
A - Running
B - Left Turn
C - Right Turn
D - Ground
E - Brake
F - Utility As explained above, some towing vehicles will have only the first three wires, running, left turn, and right turn.

Likewise, the trailer will have light wires 20 which individually will be identified as:
A - Running
B - Left Turn
C - Right Turn
D - Ground
E - Brake
F - Utility Plug means 22 extends by pig tail 24 from the box. The plug means 22 is a means for electrically connecting the hot wires 18 from the towing vehicle to electrical circuits 26 in the box. These electrical circuits within the box will have switch wires 28 which are attached through the plug means to the hot wires 18 from the towing vehicle.

Socket means 30 is located flush on one side of the convertor box 16. The socket means is means for electrically connecting each of the light wires 20 to receptacle wires 32 which are a part of the electrical circuits within the box. As stated above, the preferred embodiment is for there to be six switch wires 28 and six receptacle wires 32.

Each of the switch wires will have a terminal portion which is designated as flexible switch wire 34. It will be understood that the flexible switch wire 34 could be the terminal end of the switch wire or there could be a terminal within the box where the switch wires are connected to the terminal and the flexible wires are connected to the terminal. Each of the flexible switch wires 34 will have pin 36 upon its distal end.

There will be six receptacles 38 in the box. Each receptacle will be electrically connected to one of the receptacle wires 32. I prefer to use banana plugs as the receptacles 38 and pins 36. Therefore, each pin 36 will fit each receptacle 38 so that each of the switch wires 28 may be connected to any one of the receptacle wires 32. Therefore, it may be seen that each of the hot wires 18 may be connected to any one of the light wires 20.

The electrical circuits 26 in the box include the receptacles 38, switch wires 28, receptacle wires 32, flexible switch wires 34, pins 36, and receptacles 38. It will be understood that the pins 36 and flexible switch wires 34 with the receptacles 38 form at least a part of switch means for changeably connecting each of the hot wires 18 from the towing vehicle 10 to any of the light wires 20 from the trailer 14, thus, the switch means are a portion of the electrical circuits.

Six test lamps 40 are electrically connected to six test receptacles 42 upon the box 16. The other terminal of each test lamp is grounded at ground 44.

In order to convert the wires which come from a random fashion from the pickup to the random fashion in which they are attached to the trailer, the trailer is attached to the trailer hitch 12 and the hot wires 18 are plugged into the plug means 22, and the light wires 20 are plugged into the socket means 30. Each of the pins 36 is placed in one of the test receptacles 42. A set of the lights, such as the running lights of the towing vehicle, are activated. Then one of the test lamps 40 will glow. When the test light 40 glows, it will be known that that pin 36 is electrically connected to the hot running wire 18A from the towing vehicle. Then that pin is placed in each of the receptacles 38 in turn until the running lights of the trailer 14 glow. Therefore, at that time, the pin 36 may be firmly seated in that receptacle 38, and for that particular wiring combination of that towing vehicle and that trailer, the running lights are properly connected. Stated otherwise, the hot wire is connected to a correlative light wire. After this, the left turn signal may be activated. Then the process is repeated. I.e., each of the five remaining pins 36 is identified as the test lamp 40 blinks. Then that identified pin is placed in each of the five remaining receptacles 38 until the left signal lights of the trailer 14 blink, and at that time, the pin 36 is seated firmly in the receptacle 38, and it will be known that for that towing vehicle and that trailer that the left turn signal lights are correctly connected. The same procedure is followed for as many of the wires that come from the towing vehicle as that particular towing vehicle has. The ground wire can be left until last because it cannot be activated to cause the test light 40 to glow.

Writing strips 45 are provided on the inside of the lid of the box 16 so that notation of the truck and its hot wires and trailer and its light wires may be identified. The flexible switch wires 34 are color coded for this purpose.

As stated before, this invention make provisions for the fact that there may be less than a total of six wires on the towing vehicle or the trailer. An example will be used wherein there are four hot wires on the towing vehicle and three light wires on the trailer. A two-ended hot adapter jumper 46 is provided. One end of the towing jumper 46 will have hot socket 48 thereon. The hot socket will have six connectors on it and will mate with the plug means 22 on the convertor box 16. The other end of the hot jumper 46 will have a tow plug 50 thereon which will have a four wire plug on it which mates the four wires socket on the towing vehicle. The hot jumper 46 will have four wires which will connect each of the points from the tow plug 50 to one of the points in the hot socket 48. Therefore, each of the four hot wires 18 will be connected to the plug means 22 upon the box. There will be two of the six pins 36 which are unconnected to a hot wire.

Likewise, a two-ended light adapter jumper 52 is provided. The light jumper has light plug 54 on one end which will be connected with socket means 30 upon the box. The other end of the light jumper 52 will have trailer socket 56 thereon, and will be adapted to receive the plug having the light wires 20 from the trailer 14. Since the trailer 14 in this example has only three wires, there will be only three wires in the light jumper 52. These three wires will be connected from the three points of the trailer socket 56 to any of the three points of the light plug 54 which will be connected to any three of the six receptacles 38.

I prefer to provide a clamp means 58 on the box for structurally attaching the box to the trailer 14 near the trailer hitch 12. It will also form a temporary ground; however, in many cases a permanent ground will also be provided as one of the wires. As shown, the clamp means 58 is in the form of a strap around the box 16 on the tongue of the trailer 14.

The embodiment shown and described above is only exemplary. I do not claim to have invented all the parts, elements or steps described. Various modifications can be made in the construction, material, arrangement, and operation, and still be within the scope of my invention.

The restrictive description and drawing of the specific examples above do not point out what an infringement of this patent would be, but are to enable one skilled in the art to make and use the invention. The limits of the invention and the bounds of the patent protection are measured by and defined in the following claims.

I claim as my invention:

1. Structure for matching electrical connections of
   a. a towing vehicle having
   b. a trailer hitch with
   c. a trailer hitched thereto;
   d. hot wires on the towing vehicle for activating stop lights, turn lights, running lights, and the like on the trailer, and
   e. light wires on the trailer connected to stop lights, turn ights, running lights, and the like on the trailer;
   f. wherein the improvement comprises:
   g. a box;
   h. switch means in the box for changeably connecting any one of the hot wires to any of the light wires;
   i. plug means extending from the box for electrically connecting each of said hot wires to said switch means;
   j. socket means on the box for electrically connecting each of the light wires to said switch means;
   k. a two-ended hot adapter jumper having
      i. a hot socket on one end mated with the plug means extending from the box,
      ii. a tow plug on the other end adapted to plug into a socket on the towing vehicle; and
   1. a two-ended light adapter jumper having
      i. a light plug on one end mated with the socket means on the box, and
      ii. a light socket on the other end adapted to receive a plug on the trailer.

2. The invention as defined in claim 1, wherein there are:
   m. six switch wires extending from the switch means to the plug means extending from the box; and
   n. six receptacle wires running from said switch means to the socket means on the box.

3. The invention as defined in claim 1, wherein said switch means includes:
   m. a plurality of pins,
   n. a switch wire electrically connected through a flexible switch wire to each of the pins and to one of the hot wires;
   o. a plurality of receptacles;
   p. a receptacle wire connected to each of the receptacles and to one of the light wires;
   q. each pin fitting each receptacle;
   r. so that each hot wire may be connected to any of the light wires through the switch means.

4. The invention as defined in claim 3, further comprising:
   s. six switch wires extending from the switch means to the plug means extending from the box; and
   t. six receptacle wires running from said switch means to the socket means on the box.

5. The invention as defined in claim 4, further comprising:
   u. a lamp ground wire in the box;
   v. a plurality of test receptacles; and
   w. a test lamp connected from each of the test receptacles to the lamp ground wire.

* * * * *